United States Patent [19]

Bose et al.

[11] Patent Number: 5,742,896
[45] Date of Patent: Apr. 21, 1998

[54] DIVERSITY RECEPTION WITH SELECTOR SWITCHING AT SUPERAUDIBLE RATE

[75] Inventors: Amar G. Bose, Wayland; William R. Short, Ashland, both of Mass.

[73] Assignee: Bose Corporation, Framingham, Mass.

[21] Appl. No.: 612,181

[22] Filed: Nov. 9, 1990

[51] Int. Cl.$^6$ .................................................. H04B 17/02
[52] U.S. Cl. .......................... 455/133; 455/135; 455/140; 455/141
[58] Field of Search .................... 455/65, 134, 135, 455/136, 137, 138, 139, 140, 141, 303, 133, 277.1, 277.2, 278.1; 375/100; 381/13

[56] References Cited

U.S. PATENT DOCUMENTS

| | | | |
|---|---|---|---|
| 3,934,204 | 1/1976 | Hill | 455/138 |
| 4,493,102 | 1/1985 | Weishaupt et al. | 455/303 |
| 4,499,606 | 2/1985 | Rambo | 455/278.1 |
| 4,539,710 | 9/1985 | Dinsmore | 455/134 |
| 4,674,121 | 6/1987 | Miura et al. | 381/13 |
| 4,756,023 | 7/1988 | Kojima | 455/134 |

OTHER PUBLICATIONS

850021, "FM Antenna Diversity Experiments In Philips Car Radios In Theory and Practice", Lindenimeir & Manner
Bose & Short; A Theoretical and Experimental Study of Noise and Distortion In The Reception of FM Signals; RLE #54, MIT.

*Primary Examiner*—Reinhard J. Eisenzopf
*Assistant Examiner*—Philip J. Sobutka
*Attorney, Agent, or Firm*—Fish & Richardson, P.C.

[57] ABSTRACT

Diversity reception apparatus includes a number of receivers each having a distortion detector. There is a common output channel. A comparator compares the signals detected by detectors and provides a control signal to a selector or switching circuit that couples that receiver having the preferred received signal to the common output channel.

23 Claims, 9 Drawing Sheets

COMPARATORS FOR MULTIPATH SENSE

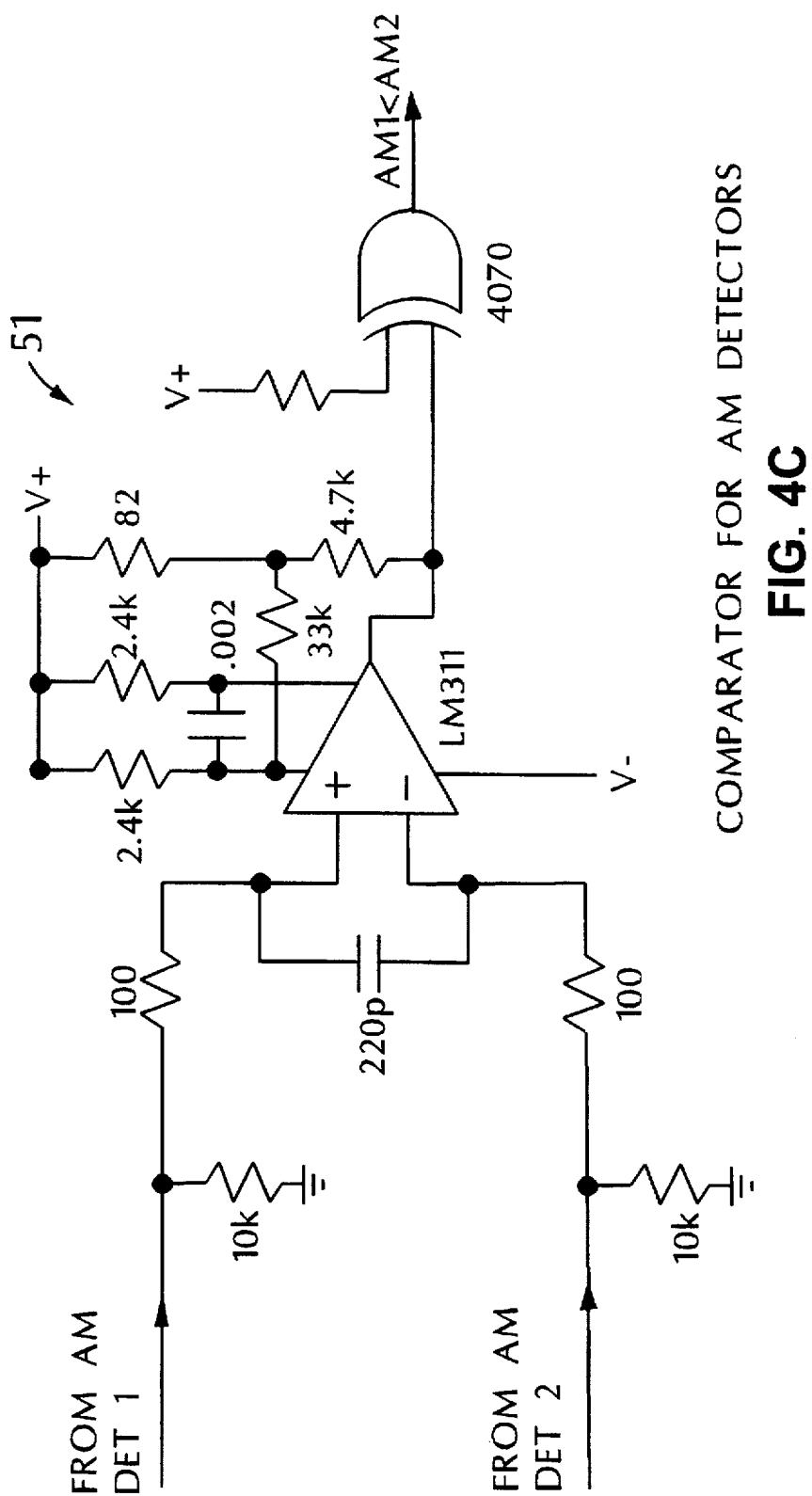
FIG. 4C  COMPARATOR FOR AM DETECTORS

LOGIC CIRCUIT

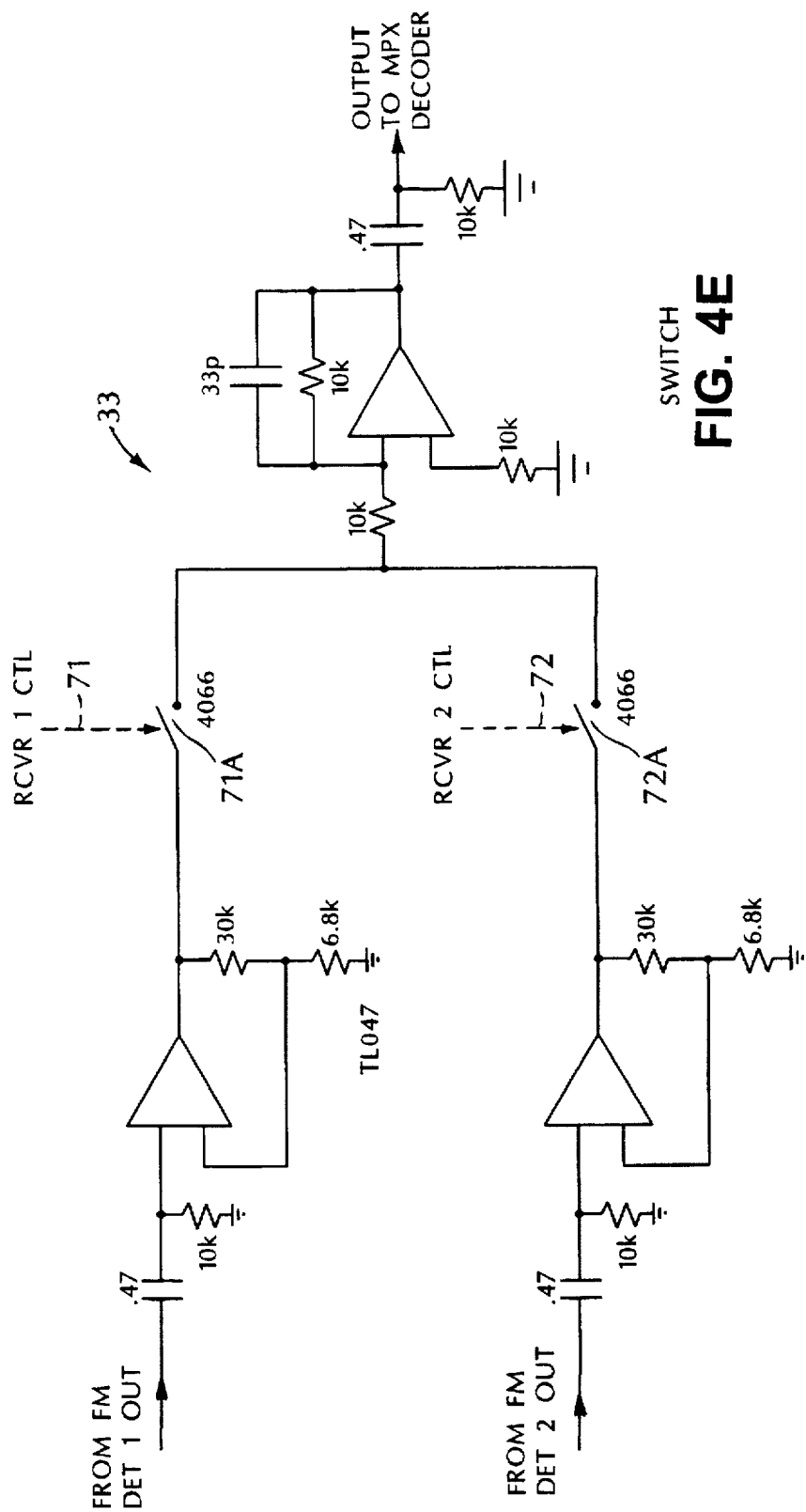
FIG. 4E SWITCH

DIVERSITY RECEPTION WITH SELECTOR SWITCHING AT SUPERAUDIBLE RATE

The present invention relates in general to diversity reception and more particularly concerns novel apparatus and techniques for rapidly switching between first and second reception paths to substantially continuously provide the preferred reception path to the receiver demodulation circuits while maintaining the effects of the switching inaudible to listeners.

Diversity reception is well known. In order to minimize the effects of fading, a resultant signal is obtained by combination or selection or both of two or more sources of received-signal energy that carry the same modulation or intelligence, but that may differ in strength or signal-to-noise ratio at any given instant.

It is an important object of this invention to provide improved diversity reception.

According to the invention, there are a plurality of receivers, typically frequency modulation (FM) receivers, each having a distortion detector, such as an amplitude modulation (AM) detector. The distortion detectors are coupled, typically DC-coupled to a comparator that provides a control signal representative of which of the receivers has the preferred received signal. The control signal is coupled to a selector or switching circuit that couples the receiver then having the preferred received signal to a common output channel or circuit. Each AM detector preferably has a super-audible bandwidth and is preferably capable of detecting spectral components substantially higher than 100 kHz. The selector or switching circuit is capable of operating at a rate higher than the highest substantial spectral components present in the AM modulation on the received signal, a speed typically substantially greater than 100 kHz. According to another feature of the invention, the receivers share a common local oscillator.

Numerous other features, objects and advantages of the invention will become apparent from the following specification when read in connection with the accompanying drawing, in which:

FIG. 4C is a schematic circuit diagram of a comparator for AM detectors;

Figure 4A:
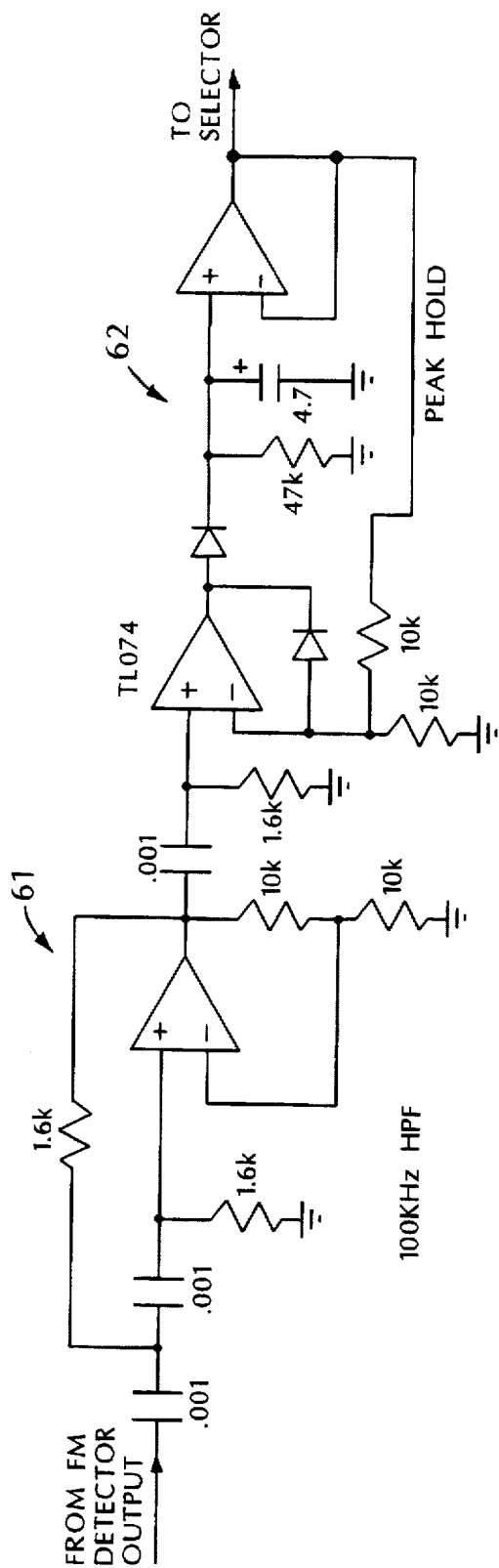
FIG. 4A is a schematic circuit diagram of an exemplary embodiment of a multipath sense circuit.
Figure 5:
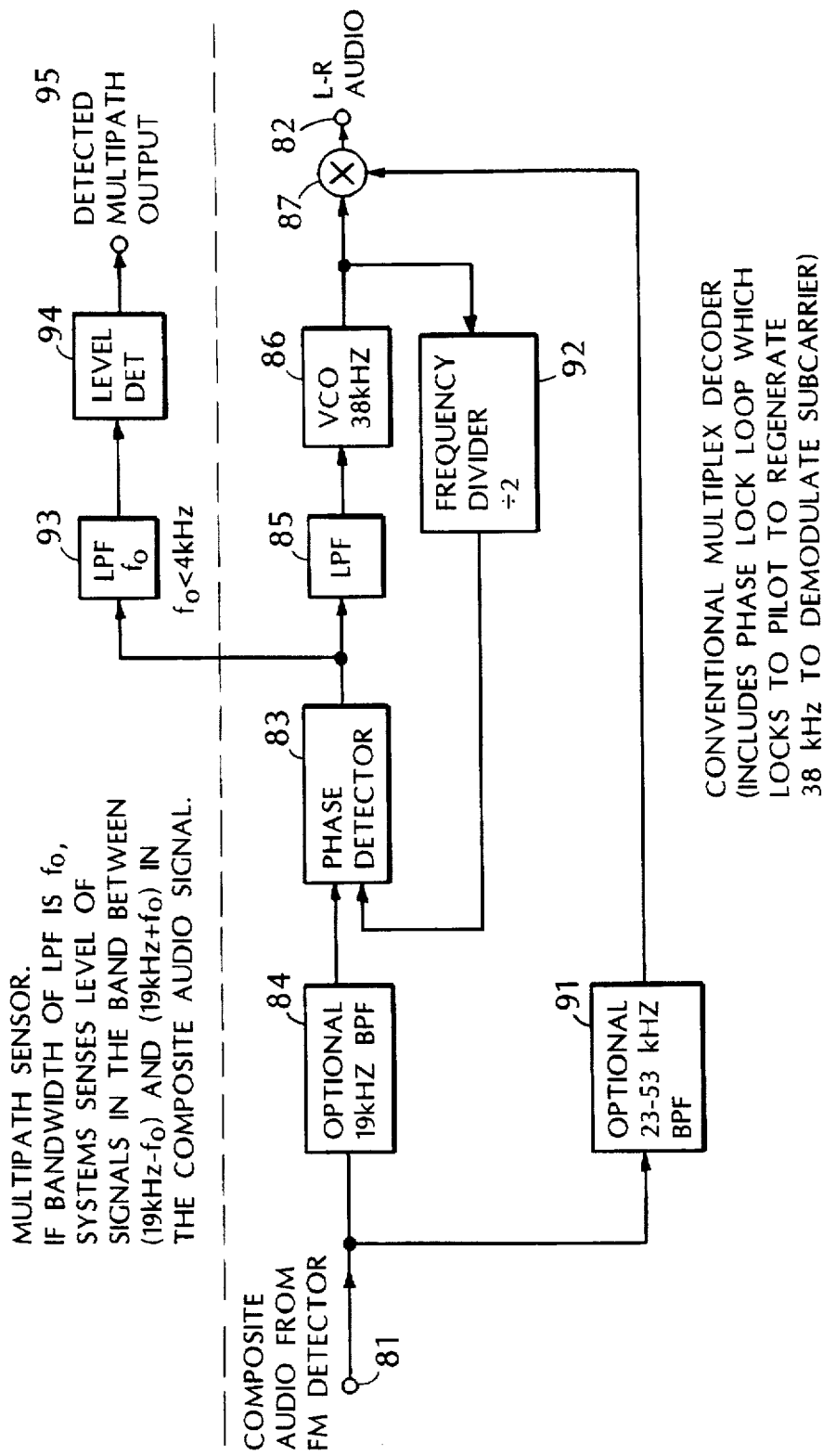

FIG. 4E is a combined schematic circuit-block diagram of a switching circuitry for coupling the preferred receiver to the multiplex decoder; and FIG. 5 is a block diagram illustrating the logical arrangement of a system for sensing multipath signals by detecting the frequency demodulated signal spectral components within the frequency range of 15 kHz to 23 kHz centered around the pilot carrier frequency of 19 kHz.

Figure 1:
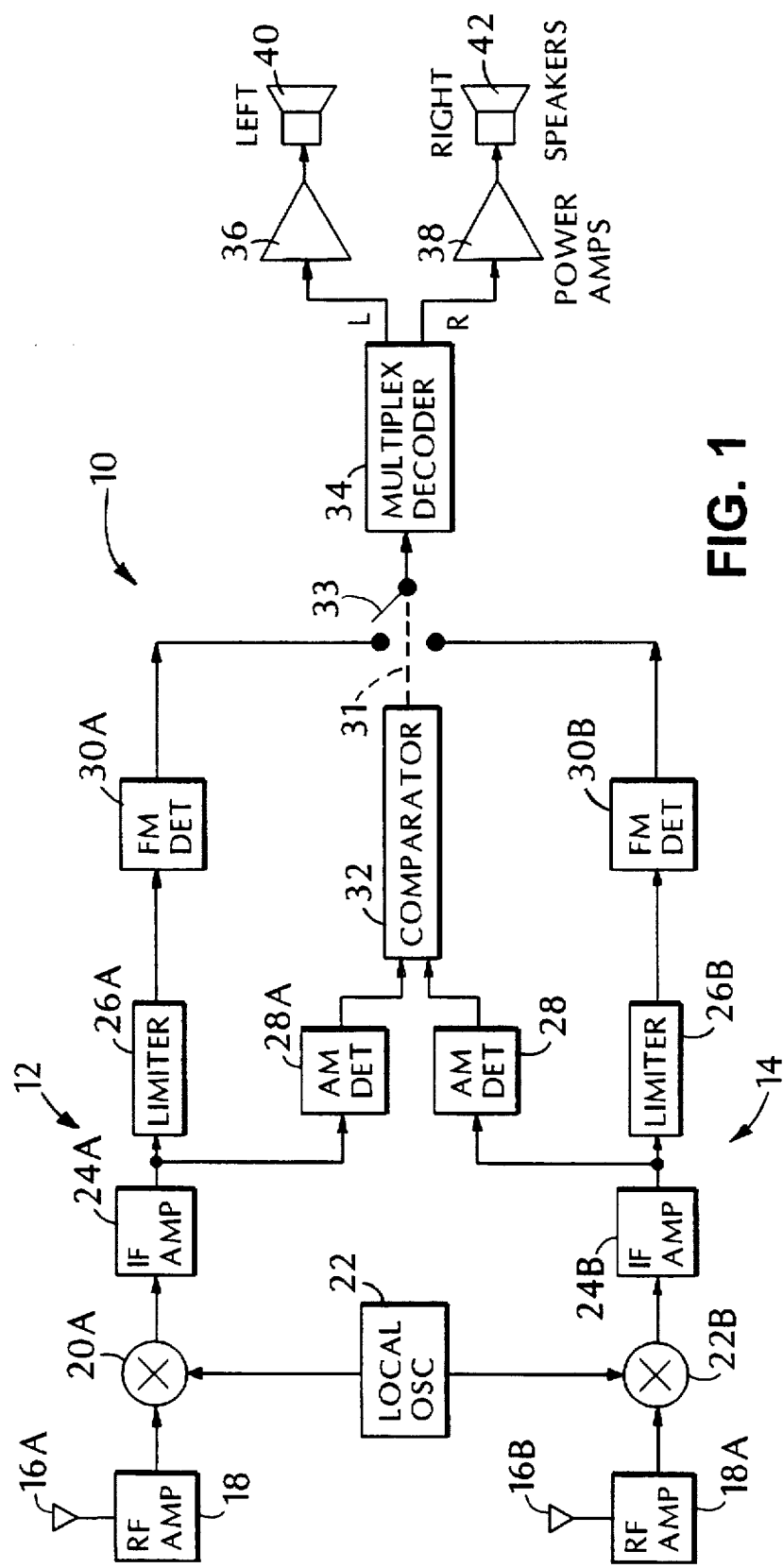
FIG. 1 shows a block diagram illustrating the logical arrangement of a system according to the invention.

With reference now to the drawing and more particularly FIG. 1 thereof, there is shown a block diagram illustrating the logical arrangement of a system according to the invention. Diversity system 10 receives signals which typically may be frequency modulated with desired information and both amplitude and frequency modulated by multipath, in a manner that interferes with demodulation of the desired frequency modulation. Diversity system 10 includes at least first and second receivers 12 and 14, respectively. Each receiver includes an antenna 16A, 16B, RF amplifier 18A, 18B, mixer 20A, 20B, IF amplifier 24A, 24B, limiter 26A, 26B, broadband AM detector 28A, 28B and FM detector 30A, 30B. Receivers 12 and 14 share a common local oscillator 22 for economy and to reduce beating effects. The outputs of broadband AM detectors 28A and 28B are coupled to comparator 32 that provides a control signal on line 31 that operates switching circuit 33. Switching circuit 33 delivers the detected FM signal from the preferred one of receivers 12 and 14 to multiplex decoder 34 that provides left and right signals to power amplifiers 36 and 38, respectively, for reproduction by left and right loudspeakers 40 and 42, respectively.

Having described the physical arrangement of a system according to the invention, its mode of operation will be discussed. In a paper entitled, "A Theoretical and Experimental Study of Noise and Distortion in the Reception of FM Signals" by Amar G. Bose and William R. Short, MIT Research Laboratory of Electronics Technical Report No. 540, it is shown that multipath effects; that is, effects produced by signals traversing multiple paths of different lengths between transmitter and receiver, produce a combination of frequency and superaudible bandwidth amplitude modulation that introduces audible distortion. Although it might be expected that the nominal 200 kHz IF bandwidth typically used in the FM broadcast band would preclude passing AM spectral components above 100 kHz to the detector, it has been shown that the combination of frequency and amplitude modulation that occurs during multipath transmissions creates amplitude modulation spectral components substantially higher than 100 kHz. Furthermore, under multipath conditions with FM modulation, which receiver carries the preferred signal changes at a superaudible rate. By having broadband AM detectors 28A, 28B capable of detecting amplitude modulation spectral components substantially in excess of 100 kHz, comparator 32 provides a control signal that rapidly operates switch 33 so that multiplex decoder 34 is always connected to receivers 12 and 14 so as to reduce audible distortion.

It has been discovered that the greatest instantaneous distortion in the demodulated FM signal occurs at the instant when the carrier level is smallest. Thus, when the AM detector output is smallest, which occurs when the carrier level is smallest, the corresponding FM detector output is the most distorted. If, at every instant, the FM detector output is selected whose corresponding AM detector is largest, those portions of the FM signal are selected for detection that are least distorted. The system, in effect, may be regarded as splicing together the least distorted portion of the audio waveform from the first receiver FM detector with the least distorted portion of the audio waveform from the second receiver FM detector. The system according to the invention thus constantly selects for audible reproduction the signal with less instantaneous distortion, resulting in a reproduced audio signal with less overall distortion than the audio output signal of either receiver FM detector. It is possible (and has been verified in the field) for both receiver FM detector outputs to be so distorted as to be unlistenable, yet the audio output provided by the invention is an audio signal of listenable quality.

It is possible (as verified in the field) for the first receiver antenna to receive a weak but undistorted signal (free from multipath) while the second receiver antenna receives a signal that is always stronger but is distorted. Under these conditions the AM detector output of the first receiver will always be less than the AM detector output of the second receiver. As a result, switch 33 would then select the second FM detector output, then providing the distorted signal. Thus, it is possible for switch 33 to remain selecting the less desirable signal.

Figure 2:
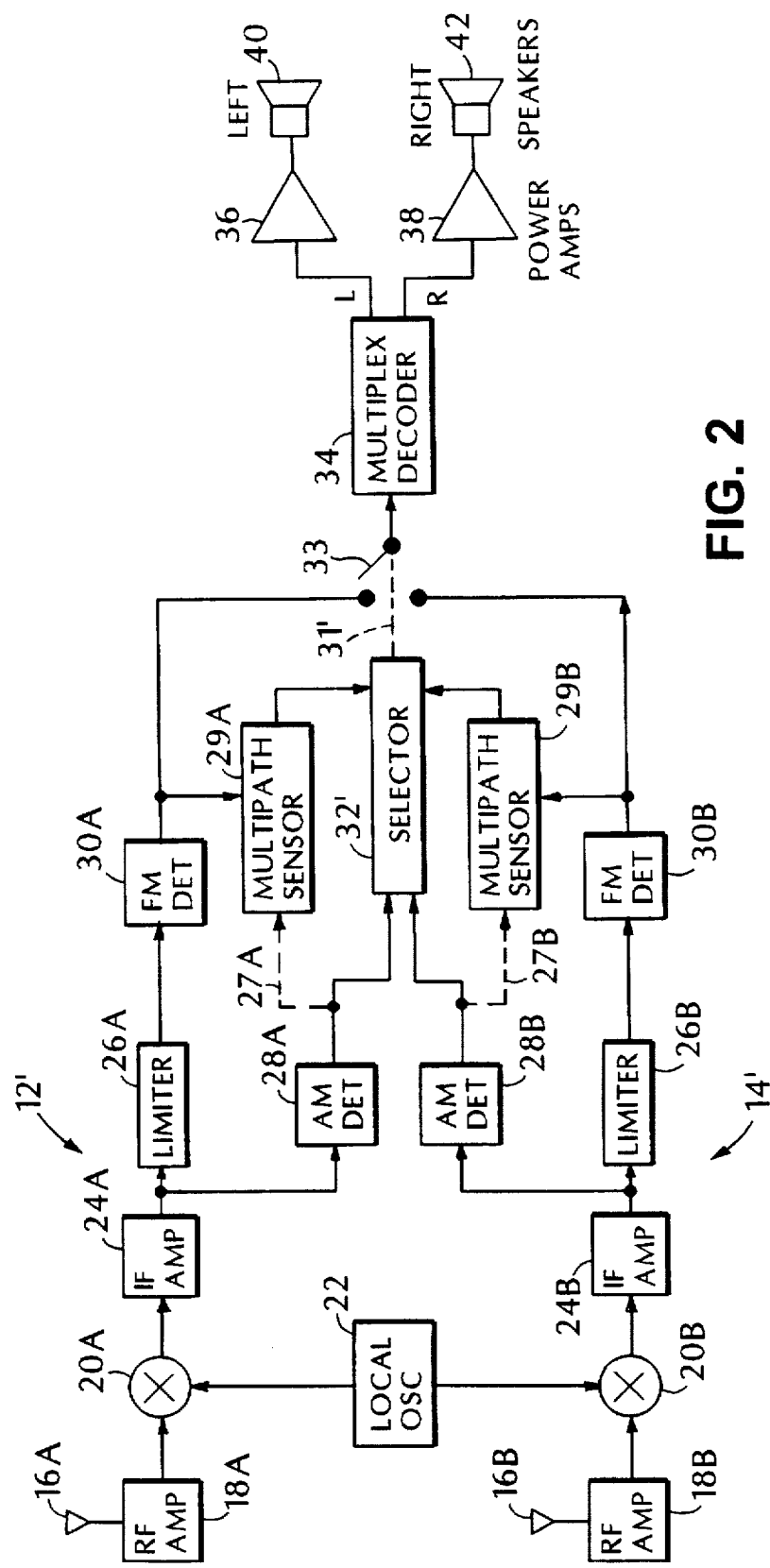
FIG. 2 shows a modification of the system of FIG. 1 having multipath detectors.

Referring to FIG. 2, there is shown a modification of the system of FIG. 1 incorporating circuitry which detects the amount of multipath present on the signal received by each of the receiver antennas. There are a number of known methods for measuring received multipath. These methods include (1) measuring the level of amplitude modulation of the received carrier; (2) measuring the amount of out-of-band signals on the FM detector output (which, for FM broadcasts in the United States, would be signals at the FM detector output having spectral components above 100 kHz); and (3) measuring the amplitude of the detected 19 kHz pilot signal. Each of these three methods can provide a quantitative measure of the amount of multipath present. A fourth approach for measuring received multipath involves detecting the frequency demodulated signal spectral components within the frequency range of 15 kHz to 23 kHz centered around the pilot frequency of 19 kHz. There should be no other signal in this region other than the 19 kHz pilot signal. The presence of any other spectral components in this frequency range indicates distortion and noise, which may be caused by multipath.

The latter approach is advantageous because detection may occur with relatively low cost circuitry, typically using circuitry existing in a conventional multiplex decoder.

In the embodiment of FIG. 2, the same reference symbols identify corresponding elements in FIGS. 1 and 2. The receivers 12' and 14' differ from receivers 12 and 14, respectively, in FIG. 1 in having multipath sensors 29A and 29B, respectively, that energize selector 32' along with the outputs of AM detectors 28A and 28B so that selector 32' may weigh all four signals in providing a control signal on line 31' that actuates switch 33 to switch back and forth between receivers 12' and 14' so as to reduce audible distortion. Each multipath sensor receives a signal from an associated detector that may be processed for sensing either or both of the out-of-band spectral components or the amplitude of the detected 19 kHz pilot signal. By connecting the output of each AM detector to an associated multipath sensor, such as represented by broken lines 27A and 27B, respectively, the multipath sensors 29A and 29B may also or alternatively measure the level of amplitude modulation of the received carrier as an indication of the amount of multipath. Selector 32' receives output signals from AM detectors 28A and 28B and from multipath sensors 29A and 29B.

Figure 3:
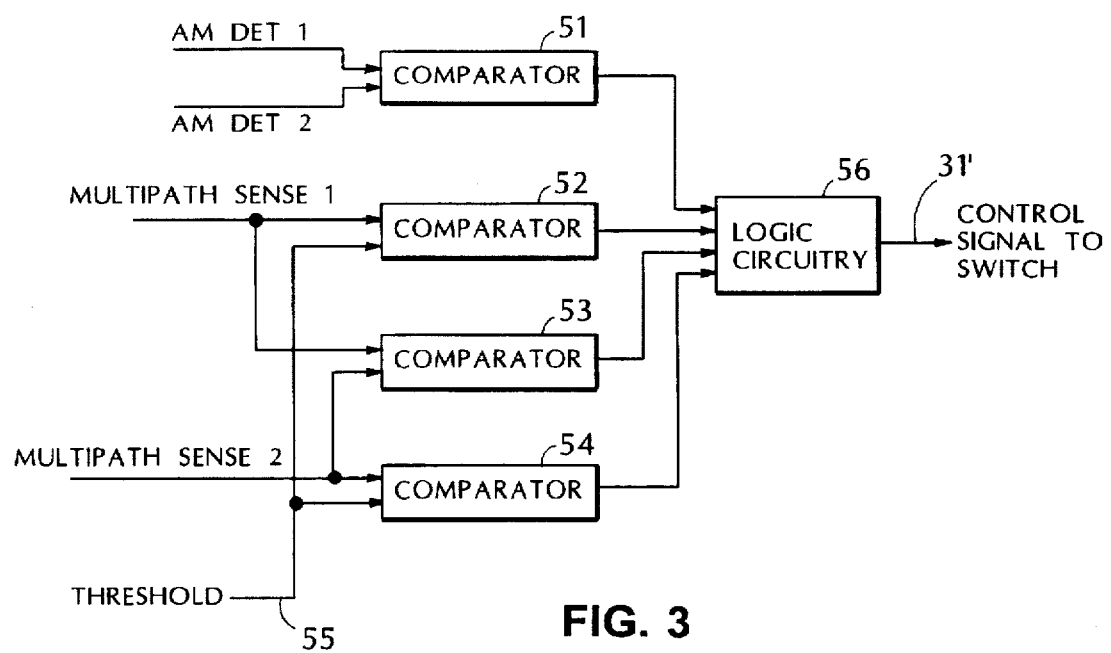
FIG. 3 is a block diagram illustrating the logical arrangement of a subsystem for controlling operation of a selecting switch based on factors including multipath.

Referring to FIG. 3, there is shown a block diagram illustrating the logical arrangement of an exemplary embodiment of selector 32. This selector comprises comparators 51, 52, 53 and 54. Comparator 51 corresponds substantially to comparator 32 in FIG. 1 and provides a signal representative of which of the outputs on AM detectors 28A and 28B is the larger. Comparators 52 and 54 compare the signals on the output of multipath sensors 29A and 29B, respectively, with a threshold signal on line 55 to provide an output signal when the associated multipath signal is greater than the threshold level on line 55. Comparator 53 provides an output signal representative of which of the signals provided on the output of multipath sensors 29A and 29B is the larger. Logic circuitry 56 then provides an output signal on line 31' that operates switch 33 so as to reduce audible distortion in the output signal provided by multiplex decoder 34.

Figure 4B:
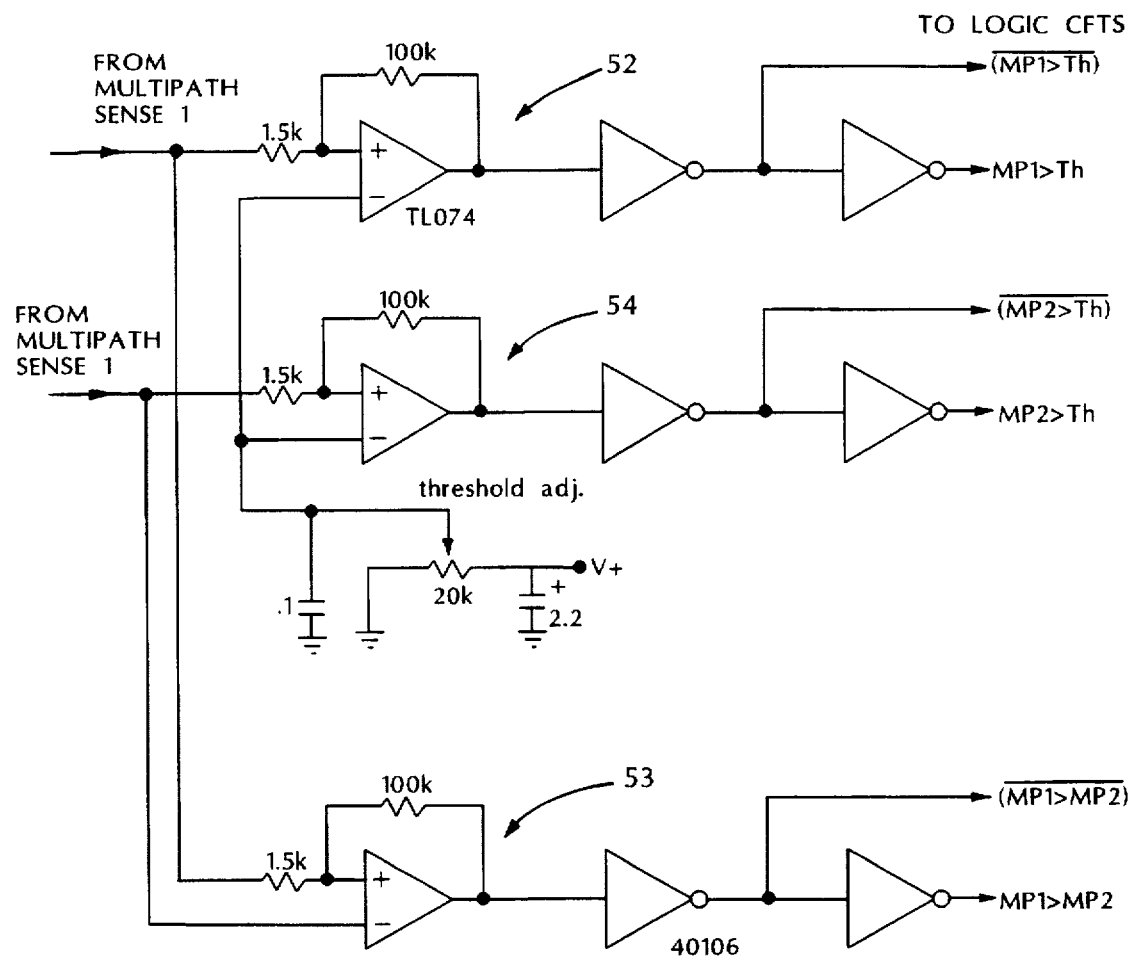
FIG. 4B is a combined block-schematic circuit diagram of a comparators for multipath sensing.
Figure 4D:
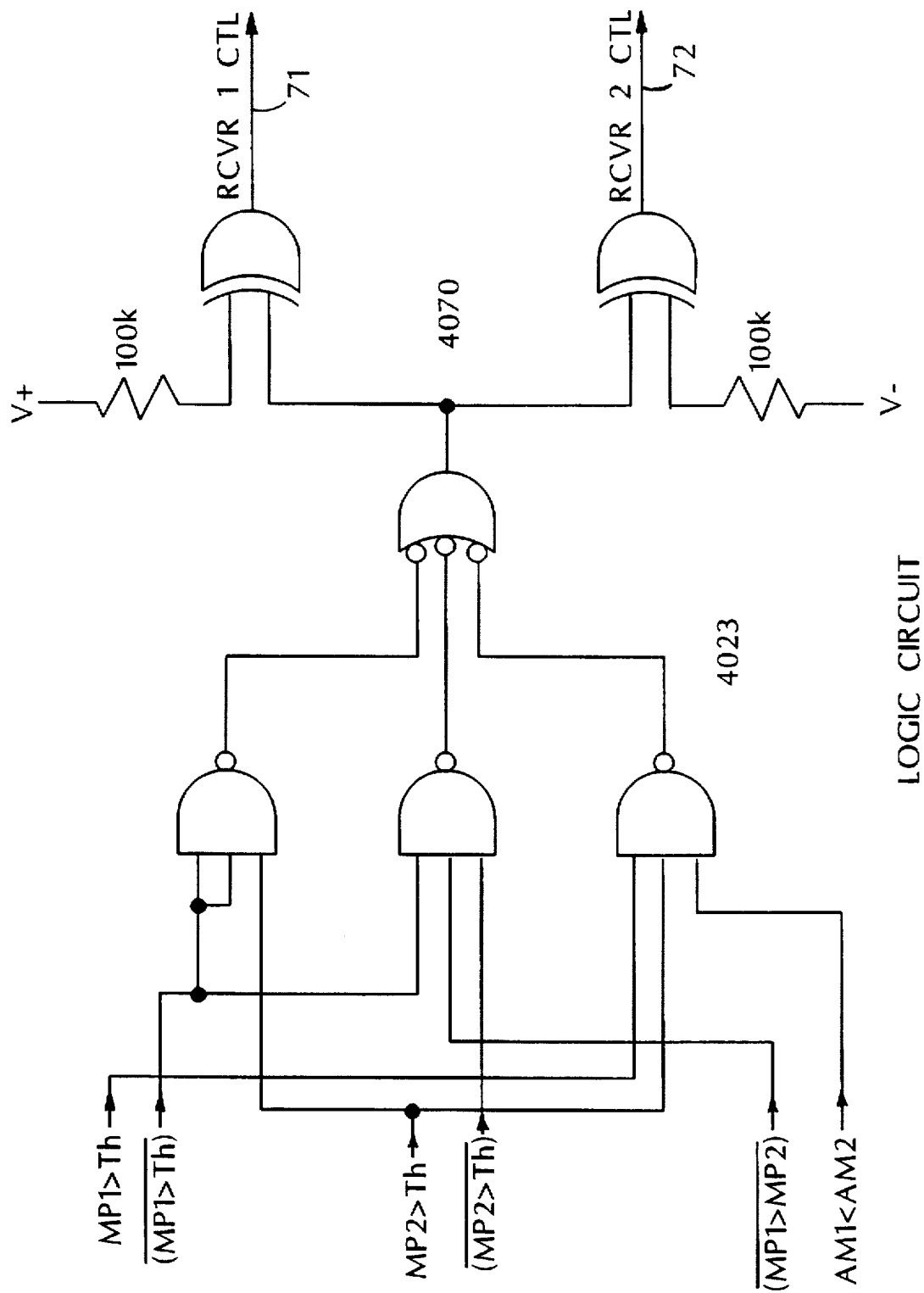
FIG. 4D is a diagram of logical circuitry for selecting the preferred receiver.

The logical arrangement of this circuitry is shown in FIG. 4D and embodies the following logical functions. If the outputs of multipath sensors 29A and 29B are below the threshold level on line 55, indicating that neither received signals suffers from significant multipath distortion, then switch 33 selects the output of that one of receivers 12' and 14' with the smaller multipath sensor output. If the output of the one multipath sensor is above the threshold level on line 55 but the output of the other is below this threshold, then switch 33 selects the output of that receiver whose multipath sensor output is below the threshold level on line 55, corresponding to the audio signal less effected by multipath. If the outputs of both multipath detectors 29A and 29B are above the threshold level on line 55, indicating that both receiver outputs are degraded by multipath, then switch 33 selects the receiver output having the larger instantaneous AM detector output as described above in connection with the operation of the system of FIG. 1. This approach has the advantage of avoiding switch 33 connecting multiplex decoder 34 to the stronger, but more distorted signal.

Referring to FIG. 4A there is shown a combined block-schematic circuit diagram of a suitable circuit for multipath sensors 29A and 29B for sensing out-of-band spectral components. This embodiment includes a high pass filter 61 having a cutoff frequency of 100 kHz cascaded with a peak hold circuit 62 that provides an output signal amplitude representative of out-of-band spectral components in the output of the associated FM detector.

Referring to FIG. 4B, there is shown a combined block-schematic circuit diagram of an exemplary embodiment of comparators 52, 53 and 54.

Referring to FIG. 4C, there is shown a combined block-schematic circuit diagram of an exemplary embodiment of comparator 51.

Referring to FIG. 4E, there is shown a combined block-schematic circuit diagram of an exemplary embodiment of switch 33. When the logic circuitry of FIG. 4D enables the receiver 1 control line 71 and receiver 2 control line 72 to close switches 71A and 72A, respectively, the switches when closed deliver the outputs from FM detectors 30A and 30B, respectively, to multiplex decoder 34.

FIGS. 4A, 4B, 4C and 4D identify specific parameter values and/or logical element components used in an actual working embodiment of the invention.

Referring to FIG. 5, there is shown a block diagram illustrating the logical arrangement of a system for sensing received multipath by detecting the frequency demodulated signal spectral components within the frequency range of 15 kHz to 23 kHz centered around the pilot carrier frequency of 19 kHz. FIG. 5 includes a conventional multiplex decoder that receives the composite audio signal from the frequency modulation detector on input terminal 81 and provides the L-R difference signal on output terminal 82. Input terminal 81 is typically coupled to one input of phase detector 83 by an optional bandpass filter 84 centered at 19 kHz to provide the detected pilot signal. Lowpass filter 85 couples the output of phase detector 83 to the control input of voltage controlled oscillator 86 that provides the locally generated subcarrier signal of 38 kHz delivered to multiplier 87. The other input of multiplier 87 is coupled to input terminal 81 typically by the optional 23–53 kHz bandpass filter 91 to provide the spectral components of the L-R signal that beat with the 38 kHz reinserted subcarrier to provide the L-R signal at the output of multiplier 87.

The output of voltage controlled oscillator 86 is coupled by frequency divider 92 to provide a 19 kHz signal that is applied to the other input of phase detector 83 to lock the phase of voltage controlled oscillator 86 to that of the detected pilot carrier signal. The output of phase detector 83 is also applied to lowpass filter 93 having a cutoff frequency $f_o$, typically at 4 kHz. Level detector 94 receives the output of lowpass filter 93 to provide an output signal of level representative of spectral components between 19 kHz–$f_o$ and 19 kHz+$f_o$ in the composite audio signal that is representative of distortion typically caused by multipath.

An important aspect of the invention involves operating the selecting switch at a speed and a rate that is fast compared to the period and frequency, respectively, of the highest modulating spectral components. The switch and associated control, drive and sensing circuits must be capable of operating at a rate that is fast compared to the highest modulating frequency spectral component.

It is believed that the method of sensing multipath degradation by sensing the level of out-of-band spectral components caused by multipath may be preferred from the standpoint of rapid switching. A system believed to provide least audible distortion senses and selects based on instantaneous carrier level combined with disabling high speed switching when at least one receiver is relatively free from the effects of multipath in a preferred approach.

While the invention has been described with specific reference to the FM broadcast band, the invention is useful in other forms of FM or AM transmissions, such as cellular telephone applications, and remote television broadcasts where the video signal is transmitted over an FM link.

While preferably the invention uses a single multiplex decoder after multiple RF receivers, it is within the invention to duplicate other receiver functions and perform the switching function effectively by enabling or disabling a respective receiver at any point in the receiver. While the example shows two receivers, it is within the principles of the invention to employ any number of receivers while selecting that receiver, or perhaps a subcombination of receivers, then carrying the preferred signal. Other embodiments are within the claims.

What is claimed is:

1. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another.

wherein each of said receivers includes a frequency modulation detector, each of said receivers further comprising, a multipath sensor having an input coupled to an associated frequency modulation detector and an output coupled to said selector, whereby said selector may weigh signals from each distortion detector and each multipath sensor in arranging to couple that one of said receivers then carrying the preferred received signal to said common output channel.

2. Diversity reception apparatus in accordance with claim 1 wherein each of said receivers includes an amplitude modulation detector and said multipath sensor has an input coupled to an associated amplitude modulation detector.

3. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an IF amplifier, each of said distortion detectors coupled to the output of a respective IF amplifier, wherein each of said receivers includes a frequency modulation detector having an output, each of said receivers further comprising, a multipath sensor having an input coupled to the output of a respective one of said frequency modulation detectors and an output coupled to said selector, whereby said selector may weigh signals from each distortion detector and each multipath sensor in arranging to couple that one of said receivers then carrying the preferred received signal to said common output channel.

4. Diversity reception apparatus in accordance with claim 3 wherein each of said receivers includes an amplitude modulation detector having an output and said multipath sensor has an input coupled to the output of a respective one of said amplitude modulation detectors.

5. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an IF amplifier,
each of said distortion detectors coupled to the output
of a respective IF amplifier;

wherein the bandwidth of each of said detectors is greater
than the bandwidth of each of said IF amplifiers, wherein each of said receivers includes a frequency
modulation detector having an output, each of said receivers further comprising,
- a multipath sensor having an input coupled to the output of a respective one of said frequency modulation detectors and an output coupled to said selector,
- whereby said selector may weigh signals from each distortion detector and each multipath sensor in arranging to couple that one of said receivers then carrying the preferred received signal to said common output channel.

6. Diversity reception apparatus in accordance with claim 5 wherein each of said receivers includes an amplitude modulation detector having an output and said multipath sensor has an input coupled to the output of a respective one of said amplitude modulation detectors.

7. Diversity reception apparatus comprising,
- at least first and second receivers each having a distortion detector with each detector capable of detecting an indication of audible distortion in an input to the detector,
- a comparator having a plurality of inputs each coupled to a respective one of said detectors and having an output for providing a control signal representative of which of said receivers then carries the preferred received signal,
- a common output channel,
- and a selector intercoupling said receivers and said common output channel and coupled to the output of said comparator arranged to couple that one of said receivers then carrying the preferred received signal to said common output channel in response to said control signal,
- said selector capable of switching at a superaudible rate from one receiver to another, wherein each of said receivers includes an IF amplifier,
each of said distortion detectors coupled to the output of a respective IF amplifier, wherein the bandwidth of each of said detectors is greater than the bandwidth of each of said IF amplifiers;

wherein the bandwidth of each of said detectors is greater than 100 KHz, wherein each of said receivers includes a frequency modulation detector having an output, each of said receivers further comprising,
- a multipath sensor having an input coupled to the output of a respective one of said frequency modulation detectors and an output coupled to said selector,
- whereby said selector may weigh signals from each distortion detector and each multipath sensor in arranging to couple that one of said receivers then carrying the preferred received signal to said common output channel.

8. Diversity reception apparatus in accordance with claim 7 wherein each of said receivers includes an amplitude modulation detector having an output and said multipath sensor has an input coupled to the output of a respective one of said amplitude modulation detectors.

9. Diversity reception apparatus comprising,
- at least first and second receivers each having a distortion detector with each detector capable of detecting an indication of audible distortion in an input to the detector,
- a comparator having a plurality of inputs each coupled to a respective one of said detectors and having an output for providing a control signal representative of which of said receivers then carries the preferred received signal,
- a common output channel,
- and a selector intercoupling said receivers and said common output channel and coupled to the output of said comparator arranged to couple that one of said receivers then carrying the preferred received signal to said common output channel in response to said control signal,
- said selector capable of switching at a superaudible rate from one receiver to another,
- wherein said distortion detector comprises an amplitude modulation detector,
- wherein each of said receivers includes a frequency modulation detector having an output, each of said receivers further comprising,
- a multipath sensor having an input coupled to the output of a respective one of said frequency modulation detectors and an output coupled to said selector,
- whereby said selector may weigh signals from each distortion detector and each multipath sensor in arranging to couple that one of said receivers then carrying the preferred received signal to said common output channel,
- each multipath sensor having an input coupled to the output of an associated amplitude modulation detector.

10. Diversity reception apparatus in accordance with claim 9 wherein each of said receivers includes an amplitude modulation detector having an output and said multipath sensor has an input coupled to the output of a respective one of said amplitude modulation detectors.

11. Diversity reception apparatus comprising,
- at least first and second receivers each having a distortion detector with each detector capable of detecting an indication of audible distortion in an input to the detector,
- a comparator having a plurality of inputs each coupled to a respective one of said detectors and having an output for providing a control signal representative of which of said receivers then carries the preferred received signal,
- a common output channel,
- and a selector intercoupling said receivers and said common output channel and coupled to the output of said comparator arranged to couple that one of said receivers then carrying the preferred received signal to said common output channel in response to said control signal,
- said selector capable of switching at a superaudible rate from one receiver to another, wherein each of said receivers includes an IF amplifier,
each of said distortion detectors coupled to the output of a respective IF amplifier, wherein said distortion detector comprises an amplitude modulation detector.

wherein each of said receivers includes a frequency modulation detector having an output, each of said receivers further comprising, a multipath sensor having an input coupled to the output of a respective one of said frequency modulation detectors and an output coupled to said selector, whereby said selector may weigh signals from each distortion detector and each multipath sensor in arranging to couple that one of said receivers then carrying the preferred received signal to said common output channel, each multipath sensor having an input coupled to the output of an associated amplitude modulation detector.

12. Diversity reception apparatus in accordance with claim 11 wherein each of said receivers includes an amplitude modulation detector having an output and said multipath sensor has an input coupled to the output of a respective one of said amplitude modulation detectors.

13. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an IF amplifier, each of said distortion detectors coupled to the output of a respective IF amplifier, wherein the bandwidth of each of said detectors is greater than the bandwidth of each of said IF amplifiers, wherein said distortion detector comprises an amplitude modulation detector, wherein each of said receivers includes a frequency modulation detector having an output, each of said receivers further comprising, a multipath sensor having an input coupled to the output of a respective one of said frequency modulation detectors and an output coupled to said selector, whereby said selector may weigh signals from each distortion detector and each multipath sensor in arranging to couple that one of said receivers then carrying the preferred received signal to said common output channel, each multipath sensor having an input coupled to the output of an associated amplitude modulation detector.

14. Diversity reception apparatus in accordance with claim 13 wherein each of said receivers includes an amplitude modulation detector having an output and said multipath sensor has an input coupled to the output of a respective one of said amplitude modulation detectors.

15. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an IF amplifier, each of said distortion detectors coupled to the output of a respective IF amplifier, wherein the bandwidth of each of said detectors is greater than the bandwidth of each of said IF amplifiers, wherein the bandwidth of each of said detectors is greater than 100 kHz, wherein said distortion detector comprises an amplitude modulation detector, wherein each of said receivers includes a frequency modulation detector having an output, each of said receivers further comprising, a multipath sensor having an input coupled to the output of a respective one of said frequency modulation detectors and an output coupled to said selector, whereby said selector may weigh signals from each distortion detector and each multipath sensor in arranging to couple that one of said receivers then carrying the preferred received signal to said common output channel, each multipath sensor having an input coupled to the output of an associated amplitude modulation detector.

16. Diversity reception apparatus in accordance with claim 15 wherein each of said receivers includes an amplitude modulation detector having an output and said multipath sensor has an input coupled to the output of a respective one of said amplitude modulation detectors.

17. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an amplitude modulation detector having an output, each of said receivers further comprising,
- a multipath sensor having an input coupled to the output of a respective one of said amplitude modulation detectors and an output coupled to said selector,
- whereby said selector may weigh signals from each distortion detector and each multipath sensor in arranging to couple that one of said receivers then carrying the preferred received signal to said common output channel.

18. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said compare, or arranged to couple that one of said receivers then carrying the preferred received signal to said common output channel in response to said control signal, said selector capable of switching at a superaudible rate from one receiver to another, wherein each of said receivers includes an IF amplifier, each of said distortion detectors coupled to the output of a respective IF amplifier, wherein each of said receivers includes an amplitude modulation detector having an output, each of said receivers further comprising,
- a multipath sensor having an input coupled to the output of a respective one of said amplitude modulation detectors and an output coupled to said selector,
- whereby said selector may weigh signals from each distortion detector and each multipath sensor in arranging to couple that one of said receivers then carrying the preferred received signal to said common output channel.

19. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein the bandwidth of each of said detectors is greater than the bandwidth of each of said IF amplifiers, wherein each of said receivers includes an IF amplifier, each of said distortion detectors coupled to the output of a respective IF amplifier, wherein the bandwidth of each of said detectors is greater than the bandwidth of each of said IF amplifiers, wherein each of said receivers includes an amplitude modulation detector having an output, each of said receivers further comprising,
- a multipath sensor having an input coupled to the output of a respective one of said amplitude modulation detectors and an output coupled to said selector,
- whereby said selector may weigh signals from each distortion detector and each multipath sensor in arranging to couple that one of said receivers then carrying the preferred received signal to said common output channel.

20. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein said distortion detector comprises an amplitude modulation detector, wherein each of said receivers includes an amplitude modulation detector having an output, each of said receivers further comprising,
- a multipath sensor having an input coupled to the output of a respective one of said amplitude modulation detectors and an output coupled to said selector,
- whereby said selector may weigh signals from each distortion detector and each multipath sensor in arranging to couple that one of said receivers then carrying the preferred received signal to said common output channel,
- each multipath sensor having an input coupled to the output of an associated amplitude modulation detector.

21. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an IF amplifier, each of said distortion detectors coupled to the output of a respective IF amplifier, wherein said distortion detector comprises an amplitude modulation detector wherein each of said receivers includes an amplitude modulation detector having an output, each of said receivers further comprising,
- a multipath sensor having an input coupled to the output of a respective one of said amplitude modulation detectors and an output coupled to said selector,
- whereby said selector may weigh signals from each distortion detector and each multipath sensor in arranging to couple that one of said receivers then carrying the preferred received signal to said common output channel,
- each multipath sensor having an input coupled to the output of an associated amplitude modulation detector.

22. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an IF amplifier, each of said distortion detectors coupled to the output of a respective IF amplifier, wherein the bandwidth of each of said detectors is greater than the bandwidth of each of said IF amplifiers, wherein said distortion detector comprises an amplitude modulation detector, wherein each of said receivers includes an amplitude modulation detector having an output, each of said receivers further comprising,
- a multipath sensor having an input coupled to the output of a respective one of said amplitude modulation detectors and an output coupled to said selector,
- whereby said selector may weigh signals from each distortion detector and each multipath sensor in arranging to couple that one of said receivers then carrying the preferred received signal to said common output channel,
- each multipath sensor having an input coupled to the output of an associated amplitude modulation detector.

23. Diversity reception apparatus comprising, at least first and second receivers each having a distortion detector with each detector capable of detecting an indication of audible distortion in an input to the detector, a comparator having a plurality of inputs each coupled to a respective one of said detectors and having an output for providing a control signal representative of which of said receivers then carries the preferred received signal, a common output channel, and a selector intercoupling said receivers and said common output channel and coupled to the output of said comparator arranged to couple that one of said receivers then carrying the preferred received signal to said common output channel in response to said control signal, said selector capable of switching at a superaudible rate from one receiver to another, wherein each of said receivers includes an IF amplifier, each of said distortion detectors coupled to the output of a respective IF amplifier, wherein the bandwidth of each of said detectors is greater than the bandwidth of each of said IF amplifiers, wherein the bandwidth of each of said detectors is greater than 100 kHz, wherein said distortion detector comprises an amplitude modulation detector, wherein each of said receivers includes an amplitude modulation detector having an output, each of said receivers further comprising,
- a multipath sensor having an input coupled to the output of a respective one of said amplitude modulation detectors and an output coupled to said selector,
- whereby said selector may weigh signals from each distortion detector and each multipath sensor in arranging to couple that one of said receivers then carrying the preferred received signal to said common output channel,
- each multipath sensor having an input coupled to the output of an associated amplitude modulation detector.

* * * * *